Patented Mar. 11, 1952

2,588,993

UNITED STATES PATENT OFFICE 2,588,993

SEMIHARD RUBBER COMPOSITION AND PLATEN COVER THEREOF

Charles H. Schroeder, Akron, Ohio, assignor to The B. F. Goodrich Company, New York, N. Y., a corporation of New York No Drawing. Application April 16, 1949, Serial No. 88,047

20 Claims. (Cl. 260—5)

My invention relates to a semi-hard rubbery composition and particularly to platen covers made of such composition for typewriters and the like.

It is an object of my invention to provide a semi-hard rubbery composition having improved resistance to permanent set and to provide a platen cover composition having improved resistance to corrugation.

Another object of my invention is to provide a platen cover composition which will effectively absorb vibration and sound.

Further objects of my invention are to provide a platen cover composition which has improved resistance to glaze, improved printing characteristics, an improved ability to make good carbon copies, and which will have less tendency to emboss the paper.

Other objects of my invention will be apparent from the description which follows.

Platens used in typewriting machines, adding machines, bookkeeping machines, and the like are usually molded of rubbery compositions in the form of a tube which is secured around a platen core. The paper to be printed is supported by such platen, and the type strikes the inked ribbon against the paper with considerable force, the force being transmitted to and absorbed by the platen. It is desirable to provide a platen whose cover is resilient enough to absorb the sound caused by the type striking the platen, but which retains sufficient rigidity to allow production of a plurality of carbon copies. Rubber compositions which most nearly exhibit these properties are known as semi-hard or semi-ebonite rubber.

The class of vulcanized rubbers customarily referred to as soft rubber is generally produced by vulcanizing rubbers in the presence of not over about 5 parts by weight of sulfur per 100 parts of rubber. Hard rubber is usually considered as that class of vulcanized rubber which is generally vulcanized in the presence of about 30 to 35 parts or more by weight of sulfur per 100 parts of rubber. Between the classes known as soft and hard rubbers is an intermediate class known as semi-hard or semi-ebonite rubbers which are generally vulcanized in the presence of from approximately 8 to 30 parts by weight of sulfur per 100 parts by weight of rubber.

I have discovered that, if a homogeneous mixture of one or more unsaturated elastomeric materials which are incapable of being vulcanized to a hard rubber together with one or more elastomeric materials which are capable of being vulcanized to a hard rubber are vulcanized with from 8 to 30 percent of sulfur based on the weight of the latter elastomeric material, the resulting platen cover composition will show improved resistance to corrugation, improved paper feed characteristics, improved resistance to glaze, excellent printing characteristics and an improved ability to make clear carbon copies.

Among the unsaturated elastomeric materials capable of being vulcanized to a hard rubber which may be employed in my invention are natural rubber, such as caoutchouc and the like, or synthetic rubber, such as the rubbery polymers of open-chained conjugated diolefins having from four to eight carbon atoms exemplified by butadiene-1,3; 2,3-dimethyl butadiene-1,3; 1,4-dimethyl butadiene-1,3 and the like, or the copolymers of these and similar conjugated diolefins with each other or with copolymerizable monomeric materials containing a single ethylenic linkage, such as styrene, acrylonitrile, methyl acrylate, methyl methacrylate, ethyl acrylate, ethyl methacrylate, 2-vinyl pyridine, or similar materials. Included in the unsaturated elastomeric materials which are incapable of being vulcanized to a hard rubber in the presence of sulfur and which may be employed in my invention are the rubbery materials commonly referred to as "Butyl" rubber and "neoprene" rubber.

"Butyl" rubber is that name given to a rubbery copolymer of a major proportion of an isoolefin having from four to seven carbon atoms with a minor proportion of an open-chain aliphatic conjugated diolefin having from four to eight carbon atoms, preferably a rubbery copolymer of from 80 to 99½ parts by weight of isobutylene with from ½ to 20 parts by weight of isoprene based on a total of 100 parts.

"Neoprene" is that name given to a rubbery polymer of a 2-chlorobutadiene-1,3, commonly known as polychloroprene, or rubbery polymers of 2,3-dichlorobutadiene-1,3 or rubbery polymers of a chlorobutadiene-1,3 with monomers copolymerizable therewith, such as isoprene, butadiene-1,3, styrene, acrylonitrile, etc.

The desired properties may be obtained by blending an unsaturated elastomeric material that is incapable of being vulcanized to a hard rubber, or capable of being vulcanized only to a soft rubber, in the presence of sulfur, such as a "Butyl" rubber or "neoprene" rubber, in proportions of from 15 to 75 parts by weight with 100 parts of a sulfur-vulcanizable elastomeric material capable of being vulcanized to a hard rubber, and vulcanizing the blend in the presence of 8 to 30 parts by weight of sulfur. However, the most satisfactory results are obtained with 25 to 50 parts of an unsaturated elastomeric material incapable of being vulcanized to a hard rubber in the presence of sulfur when blended with 100 parts of a sulfur-vulcanizable elastomeric material capable of being vulcanized to a hard rubber and vulcanized with 12 to 25 parts of sulfur and with any of the usual fillers, accelerators, softeners, etc., which are commonly used in the rubber industry.

Examples of compositions prepared in accordance with my invention are illustrated by the following recipes which are included merely for purposes of illustration, and are not intended to limit the scope of this invention.

Example 1

A typical example of a composition embodying my invention using natural rubber and the copolymer of isobutylene and isoprene ("Butyl" rubber) is as follows:

| Material: | Parts by weight |
|---|---|
| Natural rubber | 100.0 |
| Isobutylene-isoprene rubbery copolymer (97:3 copolymer) | 35.0 |
| Whiting | 300.0 |
| Carbon black | 50.0 |
| Sulfur | 15.0 |
| Softener | 8.0 |
| 2-mercaptobenzothiazole | 1.5 |
| Zinc oxide | 8.0 |
| Age resistor | 2.5 |
| Total | 520.0 |

The natural rubber is "broken down" on a mill and the "Butyl" rubber is blended with the natural rubber. The fillers, softener, sulfur, accelerator, etc., are added in the usual way and the composition is vulcanized in any convenient manner. Vulcanizing the composition in a mold at a temperature of 310° F. for a period of 60 minutes is satisfactory. The cured material is a semi-ebonite vulcanizate having the improved properties described above and a Durometer "A" hardness of from 80 to 98 points.

Example 2

A typical example of a composition using natural rubber and "Neoprene" rubber is as follows:

| Material: | Parts by weight |
|---|---|
| Natural rubber | 100.0 |
| Rubbery chloroprene polymer (GR-M) | 35.0 |
| Whiting | 275.0 |
| Carbon black | 50.0 |
| Sulfur | 13.0 |
| Softener | 10.0 |
| 2-mercaptobenzothiazole | 1.5 |
| Zinc oxide | 5.0 |
| Age resistor | 2.0 |
| Total | 491.5 |

Mixing and vulcanization may be carried out as in Example 1 with similar physical properties being obtained.

Example 3

A typical example of a composition using a synthetic rubber capable of being vulcanized to a hard rubber in combination with a "Butyl" rubber is as follows:

| Material: | Parts by weight |
|---|---|
| Rubbery butadiene-styrene copolymer (GR-S) (72% conversion) | 100.0 |
| Isobutylene-isoprene rubber (97:3 copolymer) | 30.0 |
| Clay | 100.0 |
| Carbon black | 50.0 |
| Sulfur | 15.0 |
| Softener | 9.0 |
| 2-mercaptobenzothiazole | 1.5 |
| Zinc oxide | 8.0 |
| Age resistor | 2.0 |
| Total | 315.5 |

Mixing and vulcanization may be carried out as in Example 1 with similar physical properties being obtained.

Example 4

A typical example of a composition using a synthetic rubber capable of being vulcanized to a hard rubber in combination with "Neoprene" rubber is as follows:

| Material: | Parts by weight |
|---|---|
| Rubbery butadiene-styrene copolymer (GR-S) (72% conversion) | 100.0 |
| Rubbery chloroprene polymer (GR-M) | 30.0 |
| Clay | 125.0 |
| Carbon black | 75.0 |
| Sulfur | 15.0 |
| Softener | 8.0 |
| 2-mercaptobenzothiazole | 1.5 |
| Zinc oxide | 5.0 |
| Age resistor | 2.0 |
| Total | 361.5 |

Mixing and vulcanization may be carried out as in Example 1 with similar physical properties being obtained.

The examples cited above embodying my invention afford semi-ebonite materials which have improved resistance to permanent set and corrugation, will effectively absorb vibration and sound, have improved resistance to glaze, and, when formed into a platen cover, have improved printing characteristics, improved ability to make good carbon copies, and which will have less tendency to emboss the paper.

It is obvious that my invention is susceptible of numerous variations including substitution of equivalent materials and/or variations in the quantity of materials used without varying from the scope and spirit of my invention as defined in the appended claims.

I claim:
1. A semi-hard vulcanized composition comprising a homogeneous blend of 100 parts by weight of a sulfur-vulcanizable elastomeric material capable of vulcanization to a hard vulcanizate, and from 15 to 75 parts by weight of a rubbery copolymer of a major proportion of an isoolefin having from 4 to 7 carbon atoms with a minor proportion of a conjugated diolefin having from 4 to 8 carbon atoms, which copolymer is capable of vulcanization only to a soft vulcanizate in the presence of 8 to 30 parts by weight of sulfur, vulcanized in the presence of 8 to 30 parts by weight of sulfur.

2. A semi-hard vulcanized platen cover comprising a homogeneous blend of 100 parts by weight of a sulfur-vulcanizable elastomeric material capable of vulcanization to a hard vulcanizate, and from 15 to 75 parts by weight of a rubbery copolymer of a major proportion of an isoolefin having from 4 to 7 carbon atoms with a minor proportion of a conjugated diolefin having from 4 to 8 carbon atoms, which copolymer is capable of vulcanization only to a soft vulcanizate in the presence of 8 to 30 parts by weight of sulfur, vulcanized in the presence of 8 to 30 parts by weight of sulfur.

3. The method of making a semi-ebonite composition comprising mixing together 100 parts by weight of a sulfur-vulcanizable elastomeric material capable of being vulcanized to a hard rubber in the presence of sulfur, 15 to 75 parts by weight of a rubbery copolymer of from 80 to 99½ parts by weight of isobutylene with from ½ to 20 parts of isoprene, which copolymer is capable of being vulcanized only to a soft vulcanizate in the presence of from 8 to 30 parts by weight of sulfur, and 8 to 30 parts by weight of sulfur, and heating the composition until vulcanized to a semi-ebonite product.

4. The method of making a semi-ebonite composition comprising blending 100 parts by weight of rubbery copolymer of a major proportion of a conjugated diolefin containing from 4 to 8 carbon atoms with a minor proportion of a copolymerizable monomer containing a single ethylenic linkage, which copolymer is capable of being vulcanized to a hard vulcanizate in the presence of sulfur, with 25 to 50 parts by weight of an unsaturated rubbery polymer which is capable of being vulcanized only to a soft vulcanizate in the presence of from 8 to 30 parts by weight of sulfur, dispersing from 8 to 30 parts by weight of sulfur homogeneously into the blend of rubbers, and vulcanizing the composition to a semi-hard vulcanizate.

5. A semi-hard vulcanized composition comprising a homogeneous blend of 100 parts by weight of a sulfur-vulcanizable elastomeric material capable of vulcanization to a hard vulcanizate, and from 25 to 50 parts by weight of a rubbery copolymer of a major proportion of an isoolefin having from 4 to 7 carbon atoms with a minor proportion of a conjugated diolefin having from 4 to 8 carbon atoms, which copolymer is capable of vulcanization only to a soft vulcanizate in the presence of 8 to 30 parts by weight of sulfur, vulcanized in the presence of 8 to 30 parts by weight of sulfur.

6. A semi-hard vulcanized platen cover comprising a homogeneous blend of 100 parts by weight of a sulfur-vulcanizable elastomeric material capable of vulcanization to a hard vulcanizate, and from 15 to 75 parts by weight of a rubbery copolymer of a major proportion of an isoolefin having from 4 to 7 carbon atoms with a minor proportion of a conjugated diolefin having from 4 to 8 carbon atoms, which copolymer is capable of vulcanization only to a soft vulcanizate in the presence of 12 to 25 parts by weight of sulfur, vulcanized in the presence of 12 to 25 parts by weight of sulfur.

7. A semi-hard vulcanized composition comprising a homogeneous blend of 100 parts by weight of a sulfur-vulcanizable elastomeric material capable of vulcanization to a hard vulcanizate, and from 25 to 50 parts by weight of a rubbery copolymer of a major proportion of an isoolefin having from 4 to 7 carbon atoms with a minor proportion of a conjugated diolefin having from 4 to 8 carbon atoms, which copolymer is capable of vulcanization only to a soft vulcanizate in the presence of 12 to 25 parts by weight of sulfur, vulcanized in the presence of 12 to 25 parts by weight of sulfur.

8. A semi-hard vulcanized composition comprising a homogeneous blend of 100 parts by weight of crude rubber capable of vulcanization to a hard vulcanizate, and from 15 to 75 parts by weight of a rubbery copolymer of a major proportion of an isoolefin having from 4 to 7 carbon atoms with a minor proportion of a conjugated diolefin having from 4 to 8 carbon atoms, which copolymer is capable of vulcanization only to a soft vulcanizate in the presence of 8 to 30 parts by weight of sulfur, vulcanized in the presence of 8 to 30 parts by weight of sulfur.

9. A semi-hard vulcanized platen cover comprising a homogeneous blend of 100 parts by weight of crude rubber capable of vulcanization to a hard vulcanizate, and from 15 to 75 parts by weight of a rubbery copolymer of a major proportion of an isoolefin having from 4 to 7 carbon atoms with a minor proportion of a conjugated diolefin having from 4 to 8 carbon atoms, which copolymer is capable of vulcanization only to a soft vulcanizate in the presence of 12 to 25 parts by weight of sulfur, vulcanized in the presence of 12 to 25 parts by weight of sulfur.

10. A semi-hard vulcanized composition comprising a homogeneous blend of 100 parts by weight of a rubbery copolymer of a major proportion of a conjugated diolefin containing from 4 to 8 carbon atoms with a minor proportion of a copolymerizable monomer containing a single ethylenic linkage, said copolymer being capable of vulcanization to a hard vulcanizate, and from 15 to 75 parts by weight of a rubbery copolymer of a major proportion of an isoolefin having from 4 to 7 carbon atoms with a minor proportion of a conjugated diolefin having from 4 to 8 carbon atoms, said second-mentioned copolymer being capable of vulcanization only to a soft vulcanizate in the presence of 8 to 30 parts by weight of sulfur, vulcanized in the presence of 8 to 30 parts by weight of sulfur.

11. A semi-hard vulcanized platen cover comprising a homogeneous blend of 100 parts by weight of a rubbery copolymer of a major proportion of a conjugated diolefin containing from 4 to 8 carbon atoms with a minor proportion of a copolymerizable monomer containing a single ethylenic linkage, said copolymer being capable of vulcanization to a hard vulcanizate, and from 25 to 50 parts by weight of a rubbery copolymer of a major proportion of an isoolefin having from 4 to 7 carbon atoms with a minor proportion of a conjugated diolefin having from 4 to 8 carbon atoms, said second-mentioned copolymer being capable of vulcanization only to a soft vulcanizate in the presence of 8 to 30 parts by weight of sulfur, vulcanized in the presence of 8 to 30 parts by weight of sulfur.

12. A semi-hard vulcanized composition comprising a homogeneous blend of 100 parts by weight of a rubbery copolymer of a major proportion of a conjugated diolefin containing from 4 to 8 carbon atoms with a minor proportion of a copolymerizable monomer containing a single ethylenic linkage, said copolymer being capable of vulcanization to a hard vulcanizate, and from 15 to 75 parts by weight of a rubbery copolymer of a major proportion of an isoolefin having from 4 to 7 carbon atoms with a minor proportion of a conjugated diolefin having from 4 to 8 carbon atoms, said second-mentioned copolymer being capable of vulcanization only to a soft vulcanizate in the presence of 12 to 25 parts by weight of sulfur, vulcanized in the presence of 12 to 25 parts by weight of sulfur.

13. A semi-hard vulcanized composition comprising a homogeneous blend of 100 parts by weight of rubbery copolymer of a major proportion of a conjugated diolefin containing from 4 to 8 carbon atoms with a minor proportion of a copolymerizable monomer containing a single ethylenic linkage, which copolymer is capable of being vulcanized to a hard vulcanizate in the presence of sulfur, and from 15 to 75 parts by weight of an unsaturated rubbery polymer capable of vulcanization only to a soft vulcanizate in the presence of 8 to 30 parts by weight of sulfur, vulcanized in the presence of 8 to 30 parts by weight of sulfur.

14. A semi-hard vulcanized platen cover comprising a homogeneous blend of 100 parts by weight of rubbery copolymer of a major proportion of a conjugated diolefin containing from 4 to 8 carbon atoms with a minor proportion of a copolymerizable monomer containing a single ethylenic linkage, which copolymer is capable of being vulcanized to a hard vulcanizate in the presence of sulfur, and from 25 to 50 parts by weight of an unsaturated rubbery polymer capable of vulcanization only to a soft vulcanizate in the presence of 8 to 30 parts by weight of sulfur, vulcanized in the presence of 8 to 30 parts by weight of sulfur.

15. A semi-hard vulcanized composition comprising a homogeneous blend of 100 parts by weight of rubbery copolymer of a major proportion of a conjugated diolefin containing from 4 to 8 carbon atoms with a minor proportion of a copolymerizable monomer containing a single ethylenic linkage, which copolymer is capable of being vulcanized to a hard vulcanizate in the presence of sulfur, and from 15 to 75 parts by weight of a rubbery polymer of chloroprene, vulcanized in the presence of 8 to 30 parts by weight of sulfur.

16. The method of making a semi-ebonite composition comprising mixing together 100 parts by weight of a sulfur-vulcanizable elastomeric material capable of being vulcanized to a hard vulcanizate, 15 to 75 parts by weight of a rubbery copolymer of a major proportion of an isoolefin having from 4 to 7 carbon atoms with a minor proportion of a conjugated diolefin having from 4 to 8 carbon atoms, which copolymer is capable of vulcanization only to a soft vulcanizate in the presence of 8 to 30 parts by weight of sulfur, and 8 to 30 parts by weight of sulfur, and heating the composition until vulcanized to a semi-ebonite product.

17. The method of making a semi-ebonite composition comprising mixing together 100 parts by weight of a sulfur-vulcanizable elastomeric material capable of being vulcanized to a hard vulcanizate, 25 to 50 parts by weight of a rubbery copolymer of a major proportion of an isoolefin having from 4 to 7 carbon atoms with a minor proportion of a conjugated diolefin having from 4 to 8 carbon atoms, which copolymer is capable of vulcanization only to a soft vulcanizate in the presence of 8 to 30 parts by weight of sulfur, and 8 to 30 parts by weight of sulfur, and heating the composition until vulcanized to a semi-ebonite product.

18. The method of making a semi-ebonite composition comprising mixing together 100 parts by weight of crude rubber capable of being vulcanized to a hard vulcanizate, 15 to 75 parts by weight of a rubbery copolymer of a major proportion of an isoolefin having from 4 to 7 carbon atoms with a minor proportion of a conjugated diolefin having from 4 to 8 carbon atoms, which copolymer is capable of vulcanization only to a soft vulcanizate in the presence of 8 to 30 parts by weight of sulfur, and 8 to 30 parts by weight of sulfur, and vulcanizing the composition to a semi-hard vulcanizate.

19. The method of making a semi-ebonite composition comprising blending 100 parts by weight of a rubbery copolymer of a major proportion of a conjugated diolefin containing from 4 to 8 carbon atoms with a minor proportion of a copolymerizable monomer containing a single ethylenic linkage, which copolymer is capable of being vulcanized to a hard vulcanizate, with 15 to 75 parts by weight of a rubbery copolymer of a major proportion of an isoolefin having from 4 to 7 carbon atoms with a minor proportion of a conjugated diolefin having from 4 to 8 carbon atoms, said second-mentioned copolymer being capable of vulcanization only to a soft vulcanizate in the presence of 8 to 30 parts by weight of sulfur, dispersing from 8 to 30 parts by weight of sulfur homogeneously into the blend of rubbers, and vulcanizing the composition to a semi-hard vulcanizate.

20. The method of making a semi-ebonite composition comprising blending 100 parts by weight of rubbery copolymer of a major proportion of a conjugated diolefin containing from 4 to 8 carbon atoms with a minor proportion of a copolymerizable monomer containing a single ethylenic linkage, which copolymer is capable of being vulcanized to a hard vulcanizate in the presence of sulfur, with 15 to 75 parts by weight of an unsaturated rubbery polymer capable of vulcanization only to a soft vulcanizate in the presence of 8 to 30 parts by weight of sulfur, dispersing from 8 to 30 parts by weight of sulfur homogeneously into the blend of rubbers, and vulcanizing the composition to a semi-hard vulcanizate.

CHARLES H. SCHROEDER.

REFERENCES CITED

The following references are of record in the file of this patent:

UNITED STATES PATENTS

| Number | Name | Date |
| --- | --- | --- |
| 2,185,586 | Brooks | Jan. 2, 1940 |
| 2,381,266 | Drake | Aug. 7, 1945 |
| 2,418,250 | Drake | Apr. 1, 1947 |
| 2,482,600 | Sarbach | Sept. 20, 1949 |

FOREIGN PATENTS

| Number | Country | Date |
| --- | --- | --- |
| 56,256 | Norway | Mar. 2, 1936 |